Jan. 23, 1934.   J. L. KING   1,944,516
LOOM HARNESS AND MAIL EYE THEREFOR
Filed Oct. 25, 1930

INVENTOR.
John L. King
BY
ATTORNEY.

Patented Jan. 23, 1934

1,944,516

UNITED STATES PATENT OFFICE 1,944,516

LOOM HARNESS AND MAIL EYE THEREFOR

John L. King, Atlanta, Ga., assignor to Atlanta Harness and Reed Manufacturing Company, Atlanta, Ga., a corporation of Georgia Application October 25, 1930. Serial No. 491,260

12 Claims. (Cl. 139—94)

This invention relates to cotton harness for looms, and more particularly to the mail eyes used in such harness, and the method of forming the harness with the mail eyes secured therein.

One of the principal objects of the invention is to provide a mail eye which, by simple and efficient means, is secured to the twine which forms the heddles of the harness.

A further object of the invention is to provide a mail eye which is clinched onto the harness twine by a deformation of the portion of the eye behind the twine where the latter loops through the eye.

A further object is to provide a mail eye having an elongated loop through which the harness twine is passed, during the knitting operation by which the harness is usually formed, the eye being secured in position on the twine by displacing or clinching the walls of the loop which occur intermediate the harness twine and the body of the eye, towards each other, thus pushing the twine against the extreme end of the loop and binding the loop on the twine to thereby prevent relative movement of the eye with reference to the twine and at the same time avoid cutting or injuring the twine.

Another object of the invention is to provide a mail eye having an elongated loop for receiving the harness twine, the walls of the loop between the end thereof and the body of the eye being thinned so that when the toop is clinched the thinned portions of the walls will be depressed towards each other behind the twine leaving the radius and general shape of the outer end of the loop, in which the twine lies, undistorted, and also leaving undistorted the side walls of the main body of the eye which receives the warp thread.

With these and other objects in view, which will become more apparent as the description proceeds, I have illustrated two of the various forms which the invention may take, in the accompanying drawing, in which.

Figure 1:
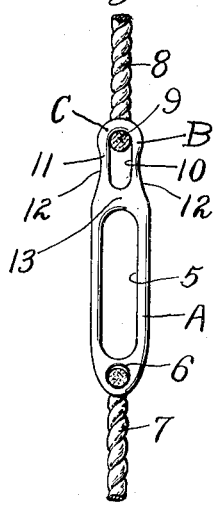
Fig. 1 represents an enlarged view of a mail eye constructed according to my invention, the loop being shown in the condition before being clinched, portions of the harness twine being shown.

Referring more particularly to the drawing, the mail eye includes a flat metal body portion A, of general rectangular shape, slotted as at 5 for the reception of a warp thread (not shown) of fabric being formed by the loom in which the harness will be mounted when in operation. An opening 6 is provided in the lower end of the eye below the slot 5, for the reception of the lower twine 7 of the harness. This twine is, in the course of manufacture of the harness, passed through the opening 6 and doubled upon itself. The upper end of the eye is provided with an elongated loop B of narrower width than the body of the eye, and through this loop is passed the upper twine 8 of the harness, such twine likewise being doubled upon itself in the process of forming the harness.

Figure 2:
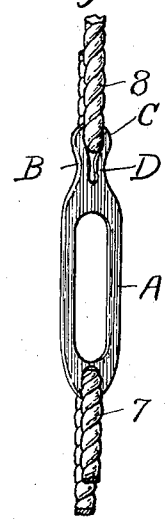
Fig. 2 represents a perspective view of the eye and adjacent portions of the harness twine, the loop being shown in clinched condition.

The bend 9 of the twine where it passes through the loop B, occupies the upper or outer end of the slot 10 formed in such loop. The side walls 11 of the loop, between the outer or upper end C of the loop and the body A of the eye, are preferably though not necessarily thinned as at 12 and are so shaped (as for instance by being inwardly curved) that as the twine is threaded into the slot, by the machine on which the harness is made, during the process of making the harness, a mechanical finger or clincher device on the machine closes the inside end of the slot 10 of the loop, by forcing the thinned walls inwardly, and forms a neck D (see Figs. 2 and 5) which grips and holds the twine in the outer end of the slot by pushing it into the extreme end of the slot and tightening it thereagainst.

The walls are made thinner on the outside lower portions of the loop B in order primarily to make the walls depress or deform toward each other behind the twine, and not over the entire length of the loop, thereby retaining the radius and general shape of the outer end C of the loop and locking the twine by pushing it against the extreme outer end of the slot. This locking action does not cut or weaken or injure the twine in any way, but at the same time securely binds it in the outer end of the loop. A further advantage arising from having the cross sectional area of the metal thinner along the lower or inner portion of the loop is that during the clinching operation there will be little or no distortion of the side walls of the body portion A of the eye. Were the thickness of the walls of the loop continued there would be a tendency during the clinching operation for such walls to fulcrum about the web 13 (which separates the slot 5 of the eye from the slot 10 of the loop) and thus distort or bulge outwardly the side walls of the body portion.

I have found that, by thus providing the eye with an elongated loop having thinned walls and necking the walls of the loop below the twine, the eye is securely fastened in place on the twine, and any movement of the eye with reference to the harness twine will be effectively prevented, even under the most severe vibrations to which the harness is subjected when in operation in a loom.

Furthermore this construction not only does away with the necessity of knotting or tying the harness twine upon the mail eyes, during the process of manufacturing the harness, or of crossing them and pinching projections or fingers of the eyes over the crossed portions as is sometimes done, but also renders unnecessary the use of any clips or other metallic binding elements to secure the harness twine together or to the mail eyes. It further does away with the necessity of soldering any of the parts of the eye together or of soldering or otherwise cementing the eye to the twine. Furthermore it provides a structure in which no knots or projections of any kind are used, either on the harness twine or on the mail eyes, and thereby prevents any chafing or abrading action between adjacent twine or twine or cords of the harness, or between such cords and the warp threads carried by the eyes when the harness is in operation. It will also be noticed that the eyes are free of any projections or fingers to be bent over or around the twine or to be brought together about the twine.

Figure 4:
Fig. 4 represents a view similar to Fig. 1 in which the mail eye is provided with a loop at each end.
Figure 5:
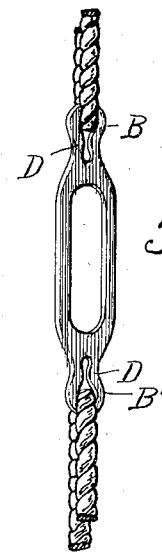
Fig. 5 represents a view similar to Fig. 2, the loops being shown in clinched condition.

If desired the mail eye may be provided with a second loop B' at its lower end in addition to the one at its upper end, as shown in Figures 4 and 5, so that the lower harness twine or cord 7' as well as the upper one, may be bound in place. It will be understood that the lower loop is formed and clinched in the same manner as has already been described with reference to the form of invention shown in Figs. 1 and 2.

The eyes, and the twine of the harness, may be coated with varnish or shellac or other suitable substances, to protect them against rusting or rotting, and to stiffen the twine as is the usual practice, but it will be understood that the mail eyes made and secured according to my invention are adequately anchored in the harness without the use of any coating, and that the invention does not depend upon such coating in any way in anchoring the mail eyes in position.

Figure 3:
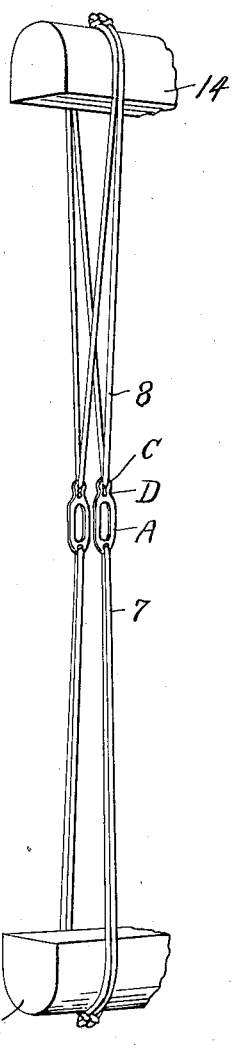
Fig. 3 represents a perspective view of a fragment of the harness employing the invention.

I have shown a fragment of a harness made according to my invention in Fig. 3, the harness being illustrated as being mounted on the bars 14 of a heddle frame. The mail eyes may be made by initially stamping or punching them out, for instance from a flat strip of metal, in the form shown in Figs. 1 or 4, the loop, or loops, being clinched after the harness twine is in position, as already described. It will be observed that the eyes are easy and economical of manufacture, and that the clinching or necking operation may be performed by machinery while the harness is in the process of manufacture, so that a rapid and economical method of locking the eyes on the twine is provided, and one which makes the harness, equipped with the eyes, susceptible to mass production.

While I have shown and described two of the forms which the invention may take, it will be understood that the invention is capable of modifications over the forms here shown and described and that the foregoing detailed description has been given for the purposes of clearness of understanding of the invention, and no undue limitations are to be deduced therefrom, but the appended claims are to be construed as broadly as permissible in view of the prior art.

Having thus described my invention what I claim as new and desire to secure by Letters Patent is:

1. In a loom harness, the combination of a mail eye having a body portion provided with an elongated loop, a harness twine extending through such loop, the walls of the loop between the twine and the body of the eye being displaced toward each other against the twine to thereby bind the twine in the end of the loop.

2. In a loom harness, the combination of a mail eye having an elongated loop, a harness twine extending through the loop, the walls of the loop below the twine being necked inwardly against the twine to bind the twine in position in the loop.

3. In a loom harness, the combination of a mail eye having a loop provided with an elongated slot, a twine extending through one end of the loop, the walls of the loop beyond the twine being thinned and being bent inwardly toward each other.

4. A mail eye for loom harness, said eye having a body portion provided with an elongated loop adapted to receive a harness twine, the walls of the loop inwardly of the outer end thereof being thinned.

5. A mail eye for loom harness, said eye having a body portion provided with a slot for receiving a warp thread, and being provided with an elongated loop adapted to receive a twine of the harness, the walls of the loop inwardly of the outer end thereof being of reduced cross sectional area.

6. A mail eye for loom harness, said eye having a body portion provided with a slot for receiving a warp thread, and being provided with an elongated loop adapted to receive a twine of the harness, the walls of the loop inwardly of the outer end thereof being of reduced cross sectional area and having their outer edges curved inwardly.

7. The method of forming a loom harness which comprises passing the twine of a harness through a loop of a mail eye and then displacing the walls of the loop between the twine and the body of the eye toward each other to thereby push the twine into the end of the loop and lock it in position.

8. The method of forming a loom harness which comprises passing a twine of the harness through a loop of a mail eye and then forming a neck in the loop between the twine and the body of the eye to thereby push the twine into the end of the loop and lock it in position.

9. A heddle eye for a loom harness comprising a metal body having intermediate and end apertures therein, the intermediate aperture being adapted to receive the warp thread and the end apertures the harness twine supports for the eye, the upper twine aperture being an elongated hole having uninterrupted walls that are squeezed in on the sides to contract the hole and bind to the desired extent against the harness twine knitted therethrough.

10. A heddle eye for a loom harness comprising a metal body having intermediate and end apertures therein, the intermediate aperture being adapted to receive the warp thread and the end apertures the harness twine supports for the eye, the upper end of the eye being reduced in width as compared with the intermediate body portion and provided with an elongated hole therein forming the upper aperture and having continuous walls that are narrow along the side of the aperture and deformed to contract the aperture and bind against the upper harness twine passing therethrough.

11. A heddle eye for a loom harness comprising a metal body having intermediate and end apertures therein, the intermediate aperture being adapted to receive the warp thread and the end apertures the harness twine supports for the eye, the metal body being reduced in width at both ends and provided with an elongated hole in each reduced end forming the upper and lower apertures and each reduced end having continuous walls that are narrow and flexible along the side of the aperture and deformed to contract the apertures and bind against the harness twine passing therethrough.

12. A mail eye for twine harness formed of flat strip metal punched to provide a central aperture adapted to receive the warp thread, and end apertures spaced from the central aperture, and each adapted to receive the harness twine, the upper twine aperture being in the form of an elongated slot having narrow readily deformable side walls crimped inwardly at their centers to define at the outer end of the aperture a confined space which will receive and tightly bind upon the upper harness twine.

JOHN L. KING.